Aug. 5, 1952  R. A. PROUD ET AL  2,605,726
MEANS FOR SEWING SNAP FASTENER TAPE
Filed Aug. 18, 1949  6 Sheets-Sheet 1

INVENTORS
RALPH A. PROUD
HOWARD C. STANLEY
BY R. E. Meech
ATTORNEY

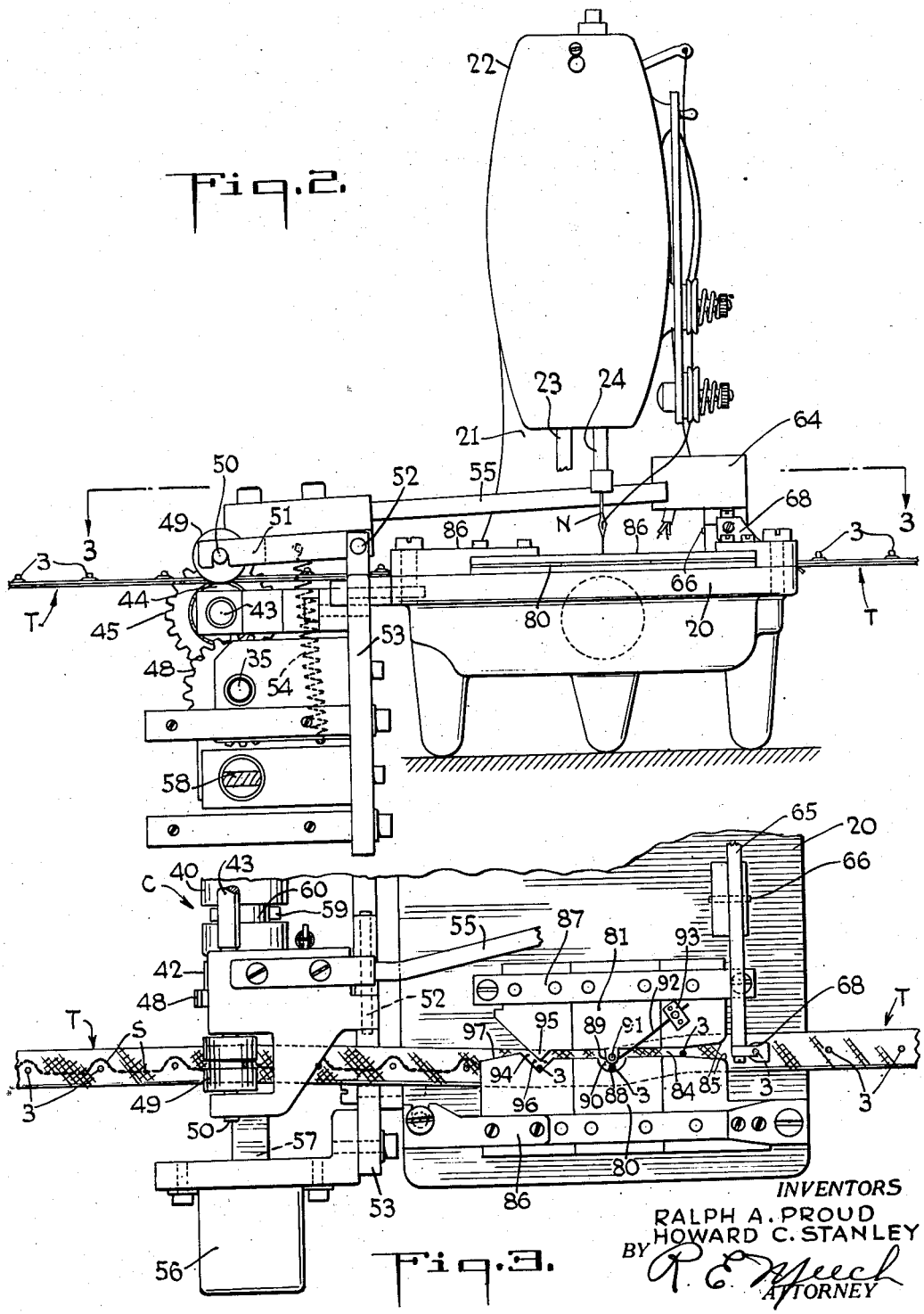

INVENTORS
RALPH A. PROUD
HOWARD C. STANLEY
BY
*R. E. Meech*
ATTORNEY

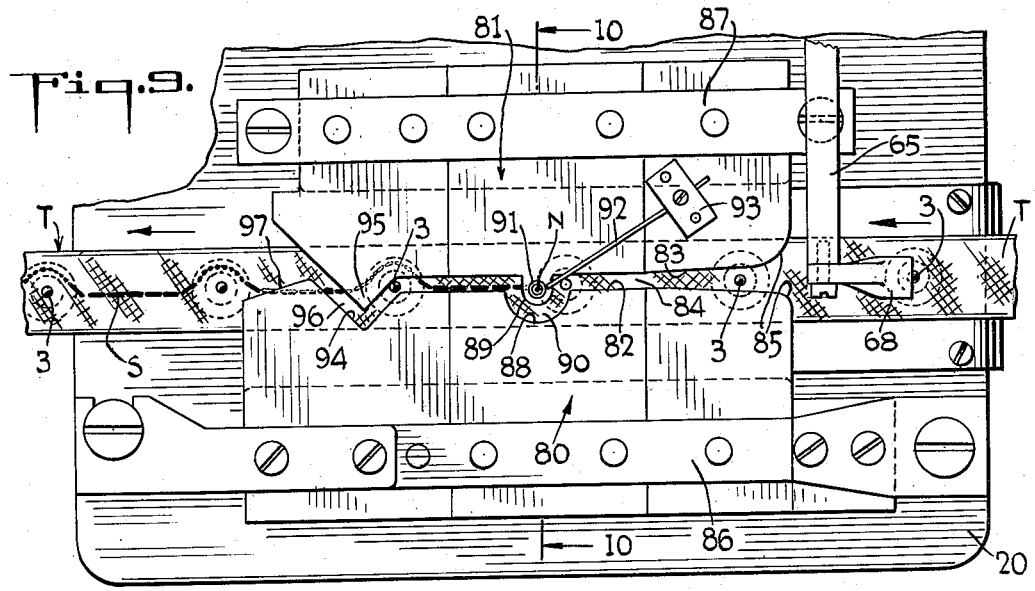
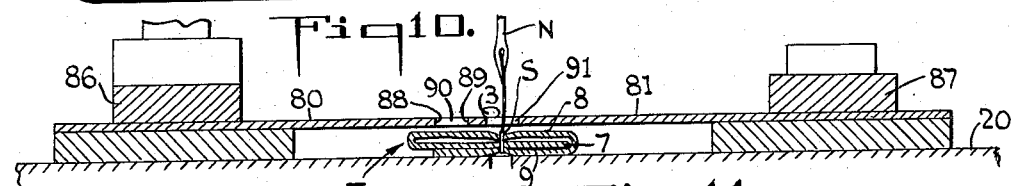
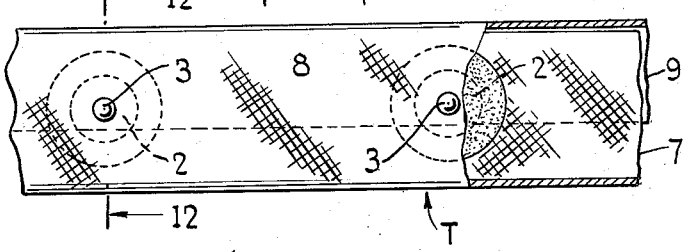
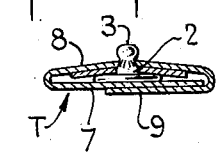
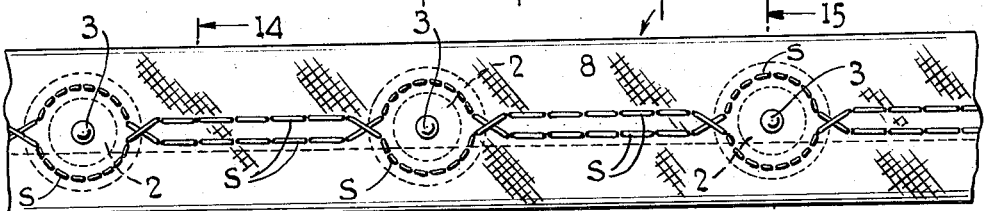
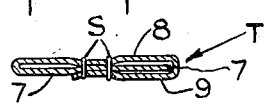
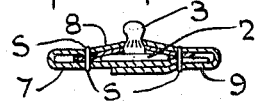

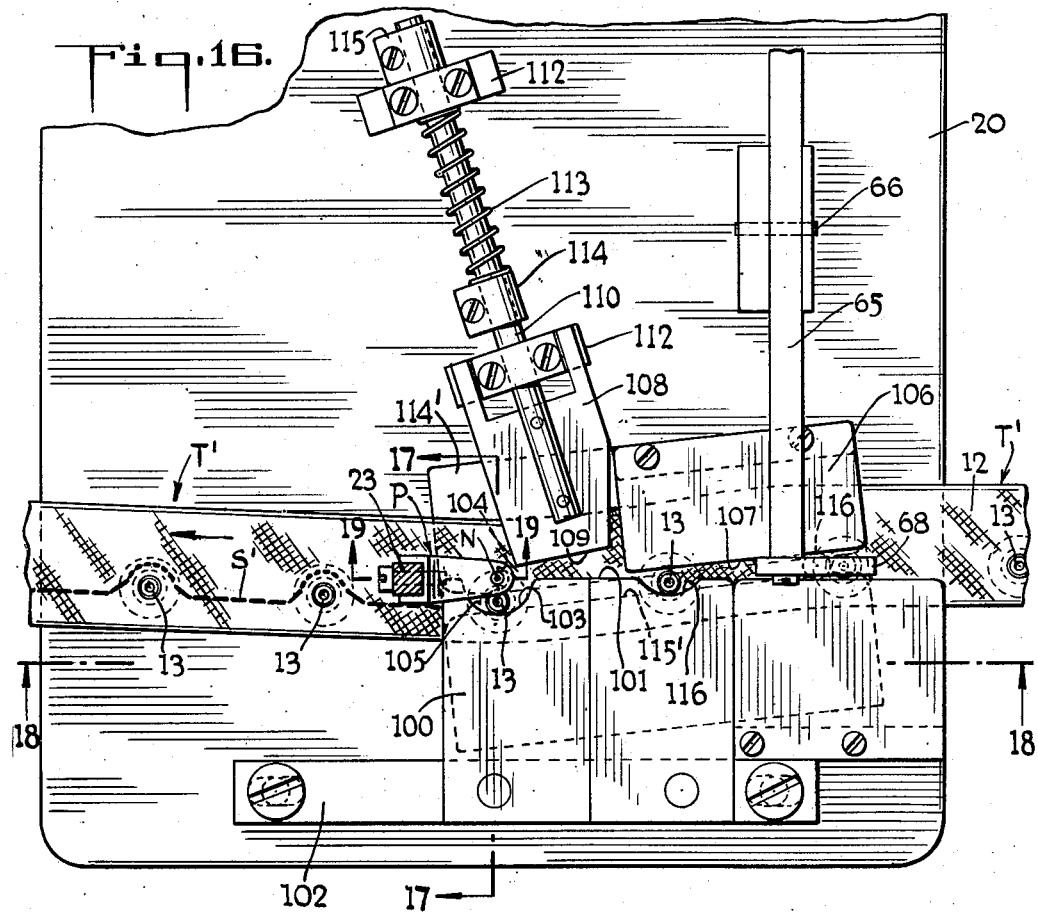
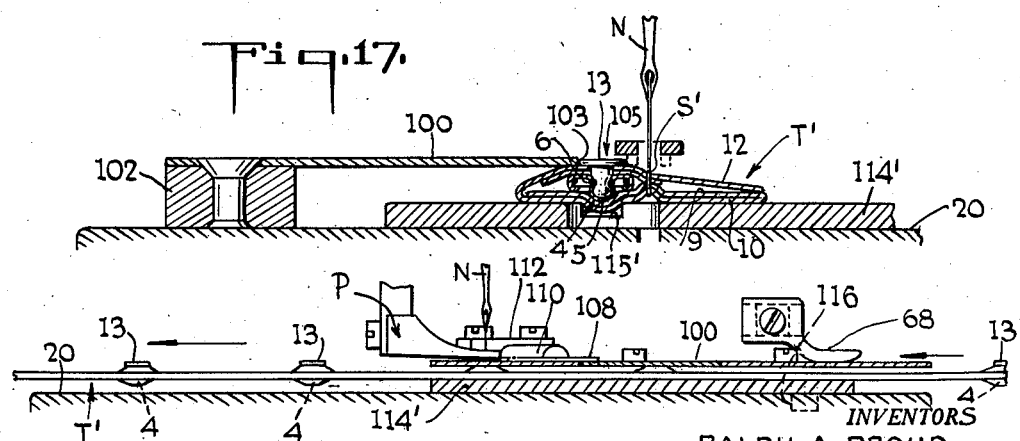

Aug. 5, 1952     R. A. PROUD ET AL     2,605,726
MEANS FOR SEWING SNAP FASTENER TAPE
Filed Aug. 18, 1949     6 Sheets-Sheet 6
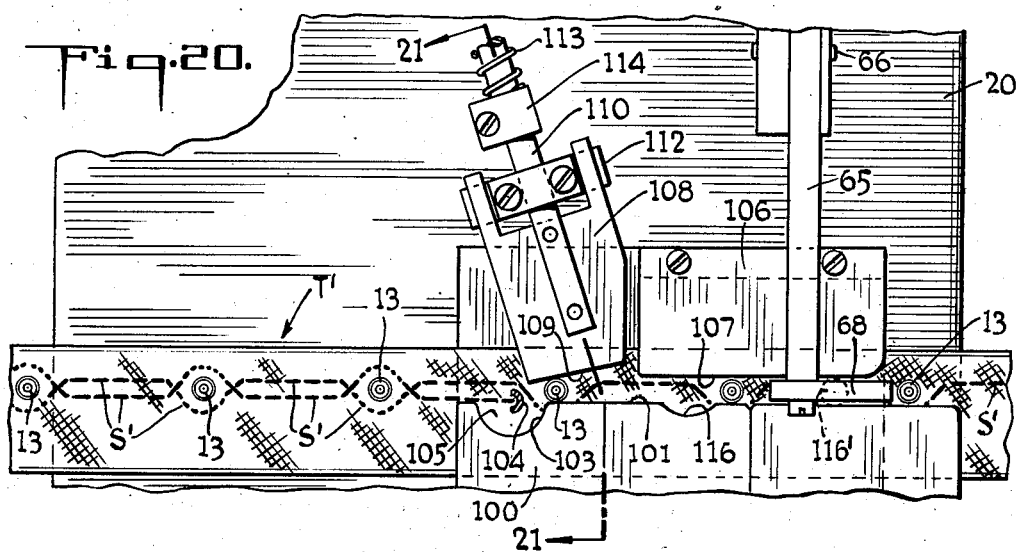
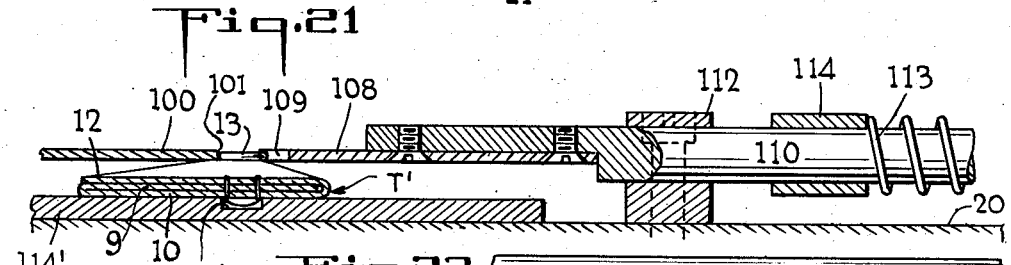
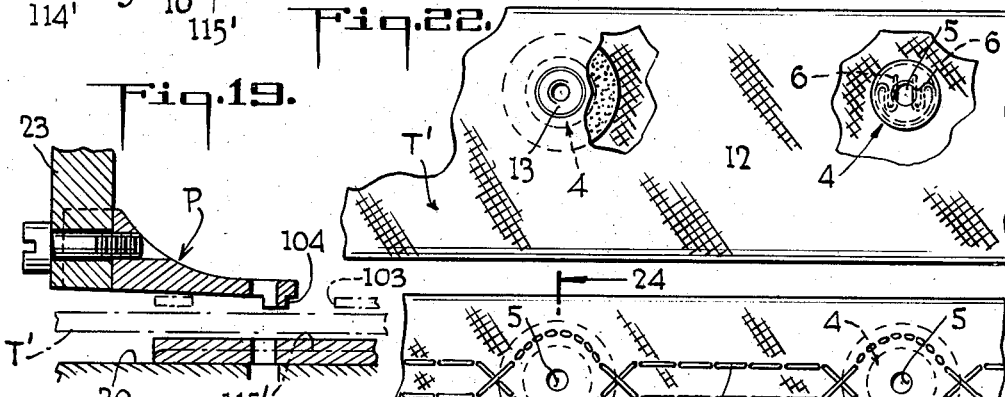
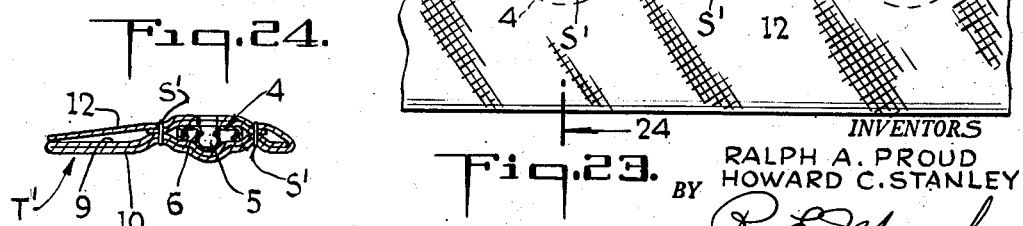
INVENTORS
RALPH A. PROUD
HOWARD C. STANLEY
BY
R. E. Meech
ATTORNEY Patented Aug. 5, 1952

2,605,726

UNITED STATES PATENT OFFICE 2,605,726

MEANS FOR SEWING SNAP FASTENER TAPE

Ralph A. Proud, Wickliffe, and Howard C. Stanley, Chagrin Harbor, Willoughby, Ohio, assignors to Talon, Inc., a corporation of Pennsylvania Application August 18, 1949, Serial No. 110,978

15 Claims. (Cl. 112—2)

This invention relates to machines for sewing snap fastener tape, and particularly to a means for guiding the tape through the machine during the sewing operation.

Snap fastener tape is used for various purposes, particularly on ladies' garments, to serve as a closure therefor. Such tape consists of two tapes or strips which are so made that the spaced-apart stud elements carried by one tape coact with the spaced-apart socket elements carried by the other tape. Usually all of the stud elements are on one tape and all of the socket elements on the other but, if desired, stud and socket elements may alternate on each tape. In any case, the socket and stud elements are so positioned, usually equidistant apart, that the sockets on one tape register with the studs on the other.

The fastener element, whether stud or socket, is positioned between two or more plies of fabric in registration with an opening through one of the plies. In the case of the stud elements, they extend through these openings, and in the case of the socket elements, they are aligned with the openings. Both the stud and socket elements are attached temporarily to the tape in one machine or operation, and then the fastener elements are retained between the plies by stitching which passes through the plies of fabric and around the fastener elements so as to embrace the same snugly whereby the fastener elements are firmly anchored in the tape. It is to a means for guiding the tape carrying the fastener elements into and through a sewing machine for stitching the tape that the present invention relates.

Accordingly, it is the general object of the present invention to provide an improved means for guiding snap fastener tape carrying either socket or stud elements into and through a sewing machine whereby a line of stitches is provided between and around the fastener elements.

It is another object of the invention to provide an improved means for guiding snap fastener tape into and through a sewing machine which will effectively guide the fastener elements in close proximity to the needle of the machine, and yet which will not interfere with stitching the tape around the fastener elements.

It is a further object of this invention to provide a work feed mechanism which will feed the tape into and through the machine at different rates of speed so longer stitches are provided between the fastener elements than therearound.

It is still another object of our invention to provide an improved means for guiding snap fastener tape into and through a sewing machine which is simple and inexpensive in its construction and use and, at the same time, efficient and effective for producing a good and uniform product.

Various other objects and advantages of this invention will be more apparent in the course of the following specification, and will be particularly pointed out in the appended claims.

In the accompanying drawings, there is shown for the purpose of illustration, two embodiments which our invention may assume in practice.

In these drawings:

Fig. 2 is an end elevational view thereof;

Fig. 3 is a sectional view taken on line 3—3 of Fig. 2, showing the guiding mechanism for attaching the stud elements to the tape with the tape in one position it assumes therein;

Fig. 9 is a plan view similar to Fig. 5, showing the tape in another position it assumes in the guiding mechanism;

Fig. 10 is a sectional view taken on line 10—10 of Fig. 9;

Fig. 11 is a fragmentary view of the stud tape before it is sewn;

Fig. 12 is a sectional view taken on line 12—12 of Fig. 11;

Fig. 13 is a fragmentary view, partly in section, of the stud tape as it is delivered from the guiding mechanism after the sewing operation;

Fig. 14 is a sectional view taken on line 14—14 of Fig. 13;

Fig. 15 is a sectional view taken on line 15—15 of Fig. 13;

Fig. 16 is a plan view, partly in section, similar to Fig. 9, of my improved guiding mechanism for sewing the tape carrying the socket elements, showing the tape positioned in one position it assumes therein;

Fig. 17 is a sectional view taken on line 17—17 of Fig. 16;

Fig. 18 is a sectional view taken on line 18—18 of Fig. 16;

Fig. 19 is a sectional view taken on line 19—19 of Fig. 16;

Fig. 20 is a plan view, partly in section, similar to Fig. 16, showing the socket tape disposed in another position it assumes in the guiding mechanism;

Fig. 21 is a sectional view taken on line 21—21 of Fig. 20;

Fig. 22 is a fragmentary view, partly in section, of the socket tape before it is delivered to the guiding mechanism and sewn;

Fig. 23 is a fragmentary view of the socket tape as it is delivered from the guiding mechanism after the sewing operation; and Fig. 24 is a sectional view taken on line 24—24 of Fig. 23.

Figure 1:
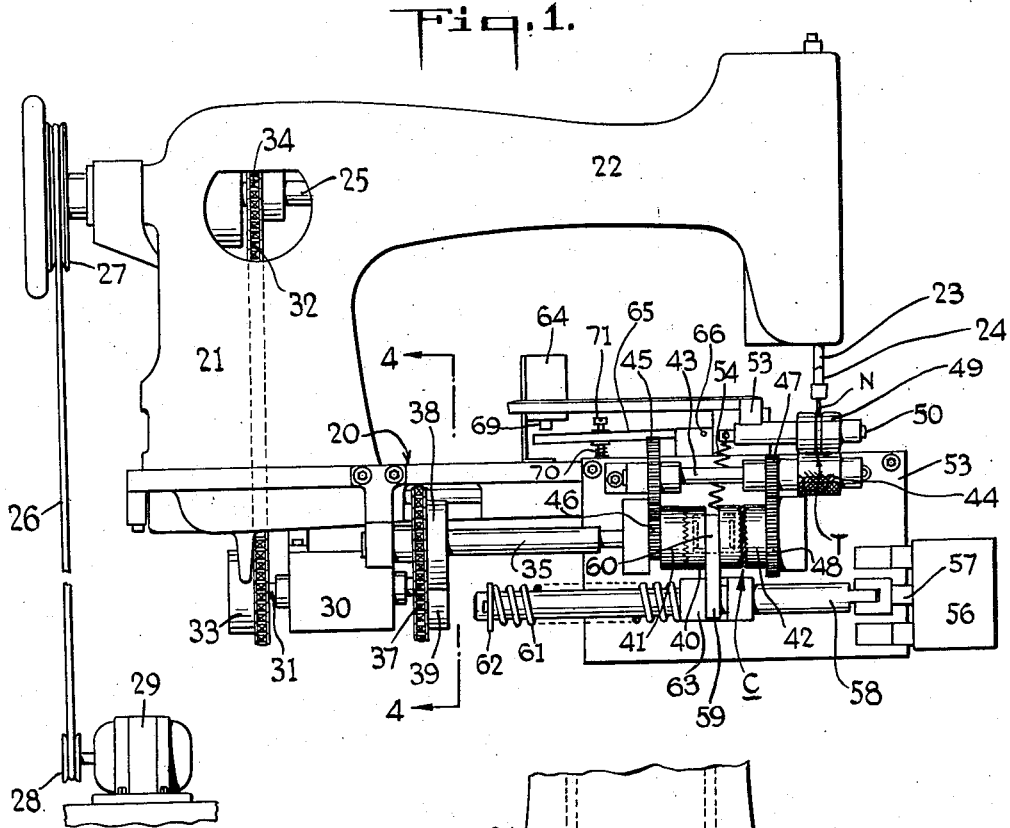
Fig. 1 is a rear elevational view of a sewing machine with which the improved guiding mechanism of the present invention is incorporated.
Figure 4:
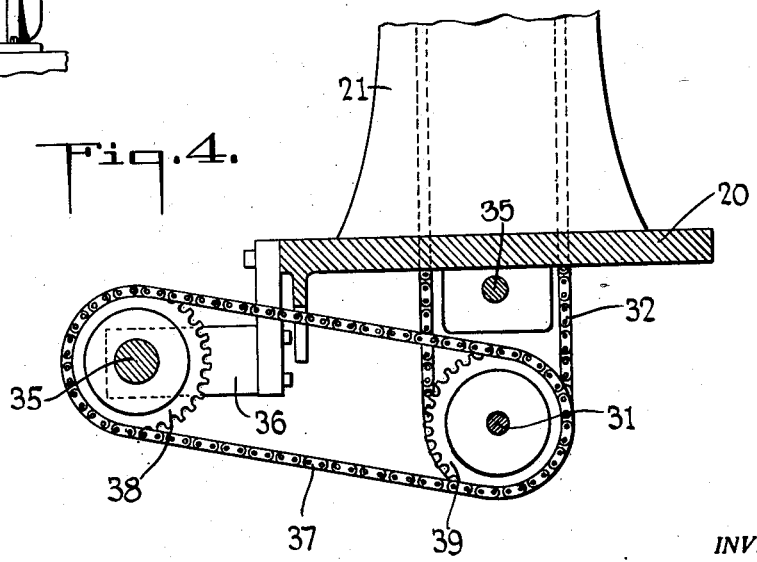
Fig. 4 is a sectional view taken on line 4—4 of Fig. 1.
Figure 5:
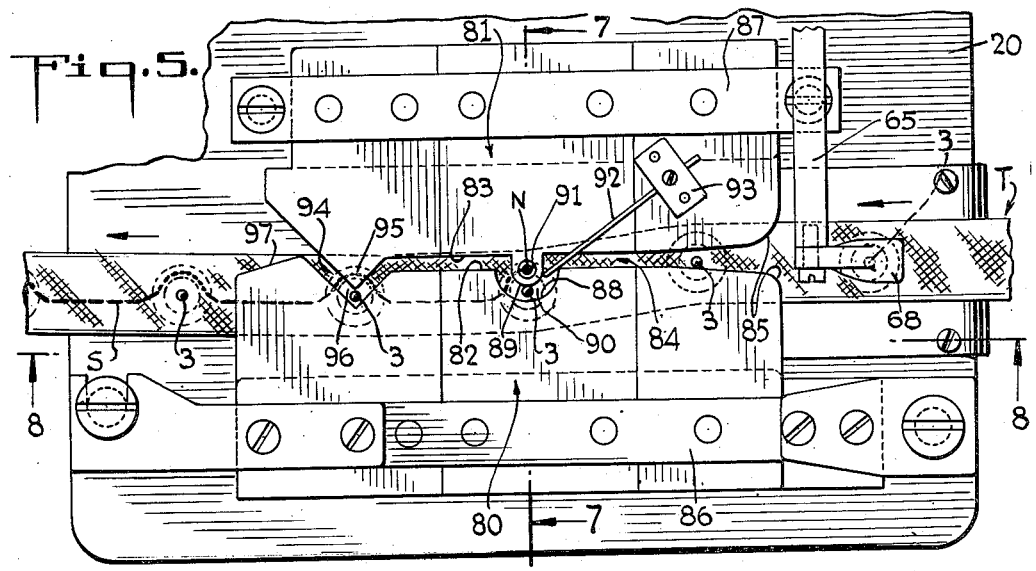
Fig. 5 is an enlarged plan view of the guiding mechanism shown in Fig. 3.
Figure 6:
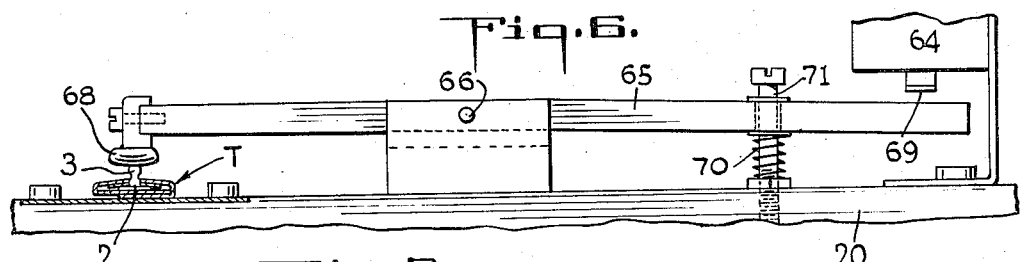
Fig. 6 is an enlarged front view of the arm and switch mechanism for controlling the feed rollers.
Figure 7:
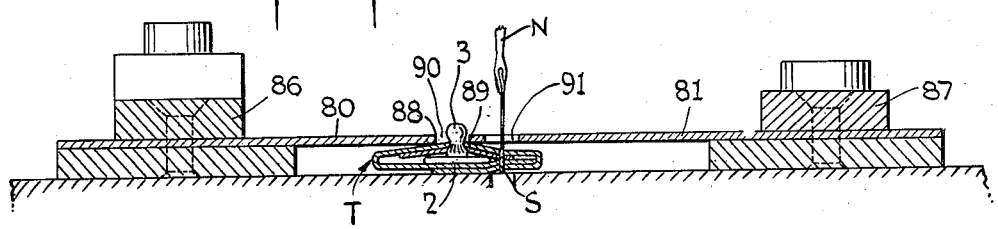
Fig. 7 is a sectional view taken on line 7—7 of Fig. 5.
Figure 8:
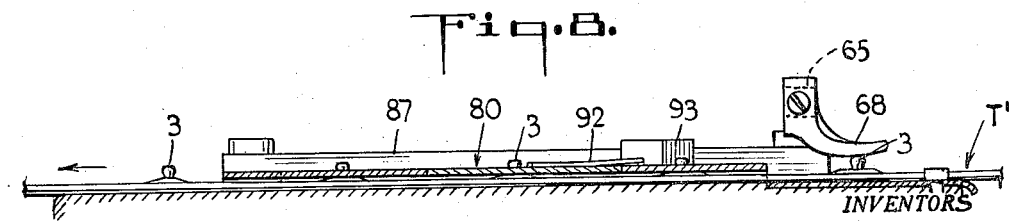
Fig. 8 is a sectional view taken on line 8—8 of Fig. 5.

In Figs. 12 and 13, there is illustrated a tape T having spaced-apart stud fastener elements 2 carried thereby each of which has a disk-like base portion and a central hollow stud having a slightly enlarged head 3. The tape T is composed of a single strip of fabric having an intermediate ply 7 extending substantially the full width of the tape, a folded-over outer ply 8, and a narrow outer ply 9 folded back upon the ply 7. The stud elements are placed equidistant apart in a row between the two plies 7 and 8. It will be understood that the outer ply 8 is perforated with the stud members holding themselves in position in the perforations.

In Figs. 21 and 22 of the drawings, there is shown a tape T' having socket members 4 carried thereby which coact with the studs 2 of the tape T in a well-known manner. These socket members 4 consist of a dish-shaped member having a central hollow dome 5 of a size to receive the head 3 of the stud. A suitable wire spring 6 is held within the dish of the socket member, and may have a semi-circular intermediate portion and two extreme S-shaped portions to provide free end arms extending through openings in the dome 5 to engage the neck of the stud. The tape T' consists of an intermediate ply 9, a folded-over outer ply 10, and an outer ply 12. As before, the socket elements 4 are positioned equidistant apart in a row between the plies 9 and 12 in registration with perforations arranged in the outer ply 12. It will be understood that the socket members are held temporarily in position therein before sewing by the temporary insertion of a stud member 13 from the outside. These stud members 13 are removed from engagement with the socket members after the sewing operation.

The present invention is shown incorporated with a sewing machine of the conventional type having a base 20, an upright portion or standard 21 connected thereto, and an overhanging gooseneck portion 22. The machine has the standard stitch-forming mechanism, including a presser foot bar 23, and needle bar 24, and a needle N carried by the overhanging portion of the arm. The machine also has the usual drive shaft 25 which is driven by a belt 26 passing over and around a pulley 27 thereon and around the pulley 28 carried by the shaft of an electric motor 29.

According to the present invention, below the base 20, as shown in Figs. 1 through 4 of the drawings, there is arranged in a suitable bracket bearing 30 attached thereto, a countershaft 31 which is driven by a chain 32 passing over and around a sprocket 33 carried thereby and over and around a sprocket 34 carried by the drive shaft 25. At the rear of the machine, there is also carried by the base 20 another countershaft 35 which is rotatably mounted in suitable bearings 36 carried by the base. This countershaft 35 is driven by a chain 37 which passes over and around a sprocket 38 arranged on one end thereof and over and around a sprocket 39 carried by the countershaft 31. On the opposite end of the countershaft 35, there is arranged a two-way clutch C with the part 40 slidably attached thereto and the parts 41 and 42 to either side thereof freely rotatable relative thereto.

Directly above the countershaft 35, there is also mounted on the rear of the base 20 another shaft 43 having preferably a knurled feed roller 44 arranged on the outer end thereof having the center thereof substantially in alignment with the needle N of the machine. On the shaft 43, there is mounted adjacent one end thereof a relatively large gear 45 which meshes with a smaller gear 46 rotatably arranged on the countershaft 35. This smaller gear 46 is connected securely to the part 41 of the clutch and adapted to rotate therewith. Intermediate the length of the shaft 43, there is mounted thereon another gear 47 which meshes with a relatively larger gear 48 rotatably mounted on the countershaft 35. This gear 48 is connected securely to the part 42 of the clutch and adapted to rotate therewith.

Above the roller 44, there is arranged preferably a rubber covered feed roller 49 which cooperates therewith to pull the tape through the machine in a manner hereinafter to be described. The roller 49 is rotatably mounted on the outer end of a shaft 50 carried by a rocker arm 51 pivotally mounted, as at 52, on the bracket 53 which in turn is carried by the base of the machine. The roller 49 is preferably maintained normally in pressure contact with the roller 44 by means of a tension spring 54 arranged between the rocker arm 51 and the bracket 53, and there is provided a lever handle 55 for releasing the pressure contact between the rollers when it is desired to introduce the tape into the machine or for any other reason.

Below the countershaft 35 and to one side of the machine, there is positioned a solenoid 56 having a plunger 57 to which there is connected an elongated rod 58. Intermediate the length of this rod, there is carried thereby a forked member 59 which straddles and fits into an annular groove 60 arranged in the driving part 40 of the clutch. On the outer end of the rod 58, there is arranged therearound a compression coil spring 61 with one end thereof abutting a bushing 62 secured to the outer end of the rod and the other end abutting a portion 63 of the bracket 53. The purpose of this spring is to maintain normally the rod 58 to the extreme left, as shown in Fig. 1, so as to maintain normally the clutch part 40 in engagement with the part 41 so as to drive the gears 45 and 46 and the shaft 43 and the feed rollers 44 and 49.

On top of the base 20, forwardly of the arm 22 and needle N, there is mounted a micro-switch 64 for controlling the energization of the solenoid 56. This micro-switch is actuated by a rocking arm member 65 pivotally mounted intermediate the length thereof, as at 66, on the base 20. One end of this arm 65 is adapted to acuate the micro-switch, as at 69, and on the opposite end thereof there is arranged a foot 68 which is disposed substantially in alignment with the needle N and which is adapted to contact the fastener elements as they successively pass thereinunder for closing the switch for a purpose and in a manner to be described. There is provided a coil spring 70 arranged around an adjustable screw 71 for maintaining the shoe or foot 68 in contact with the tape as it passes into and through the machine.

In the drawings, there is shown two types of guiding means which are similar in their construction, function, and operation. One of the guiding means is for guiding the tape T carrying the stud elements 2 through the sewing machine which will hereinafter be designated as the stud tape, and the other for guiding the tape T' carrying the socket elements 4 which will be designated as the socket tape.

Referring now to Figs. 3 through 15 which show the mechanism in accordance with the present invention for guiding the stud tape into and through the machine, there is provided a pair of oppositely disposed guide plates 80 and 81, one arranged to either side of the needle N, and with each of them having substantially straight edge guide portions 82 and 83, respectively, which are spaced apart a distance slightly greater than the diameter of head 3 of a stud 2 so as to provide a guide groove or channel 84 therebetween substantially in alignment with the needle. The forward ends of the edges 82 and 83 terminate preferably in rounded portions 85 so as to aid in guiding the tape and stud elements carried thereby into the channel 84. The guide plates 80 and 81 preferably are secured to bars 86 and 87, respectively, which in turn are connected to the top of the base 20 of the machine.

Directly opposite the needle N, there is arranged in the edge of the guide plate 80 preferably a semi-circular-shaped recess 88. On the edge of the other plate 81 directly opposite the needle and this recess 88, there is arranged a semi-circular projecting portion 89 corresponding substantially to the contour of the recess 88 but slightly smaller in diameter so as to provide a semi-circular guide channel 90 between the inner wall of the recess and the outer wall of the projection 89 which is substantially equal in width to that of the straight channel 84 between the plates. There is arranged centrally of the projecting portion 89, a circular hole 91 through which the needle N passes during the stitching of the tape and this projection 89 acts as a presser foot and takes the place of a standard presser foot on the machine. Immediately next to and forward of the projection 89, there is mounted a needle-like resilient wire member 92 the free end of which extends diagonally across the channel 84 at the intersection thereof with the channel 90 for forcing the stud elements into the semi-circular channel 90 in a manner to be described. This member 92 is secured to the plate 81 at one end thereof by means of a clamping means 93.

Rearwardly of the needle N, there is arranged in the edge of the plate 80 preferably a triangular-shaped recess 94 which is spaced a distance from the recess 88 substantially equal to that of the spaced-apart distance of the studs on the tape. On the edge of the other plate 81, there is provided a triangular-shaped projecting portion 95 corresponding to the recess 94 but slightly smaller so as to provide an angular-shaped channel 96 between the inner wall of the recess 95 and the outer side of the projection 95. The rear edge of the plate 80 is preferably relieved, as at 97.

The stud tape T is guided through the machine and sewn in the following manner. The tape is pulled through the machine by the feed rollers 44 and 49 which are driven from the main drive shaft 25 by mechanism previously described. There is provided preferably a folding device (not shown) on the front of the machine for folding the tape in a manner as shown in Figs. 11 and 12. As the tape passes to the machine, the head of the studs 3 passes into the channel 84 between the plates 80 and 81 with the studs maintained preferably against the straight edge 82 of the plate 80, as more clearly shown in Fig. 9 of the drawings. As the studs successively approach the needle 10, they are forced into the semi-circular channel 89 around the needle by means of the needle-like member 92 with the tape moving laterally so that the stud 3 follows the channel 89 around the needle to the opposite side thereof to the portion of the straight channel 84 on the opposite side of the needle. It will be seen that when any particular stud member is in the channel 89 that the immediately preceding stud member is positioned in the angular channel 96 forwardly of the needle so as to permit a length of tape substantially equal to the distance between the stud elements to move laterally. It will be also seen that when the stud elements are in the straight channel 84 that the machine stitches the tape, as at S, in a straight line between the fastener elements substantially centrally thereof, and that when the element moves around the guide channel 89 that the machine stitches the tape in an arcuate path around the fastener element.

As the tape passes into the machine, it will be seen that it passes under the foot 68 carried by the bar 65, and that when a stud element comes into contact therewith that it will be moved around its pivotal connection at 66 against the action of the spring 70 so as to close the micro-switch 64. The closing of this micro-switch energizes the solenoid 56 thereby pulling the plunger 57 and the rod 58 connected thereto to the right, as shown in Fig. 1, thereby moving the part 40 of the clutch C out of engagement with the part 41 and into engagement with the part 42 thereby changing the gearing of the feed roll 44 through the action of the gears 47 and 48 so as to feed the tape through the machine at a slower rate of speed than normally so as to provide stitches of a shorter length around the stud members, as shown in Fig. 13. After the stud member is out of contact with the foot 68, the micro-switch will then be permitted to open due to the action of the bar 65 and the spring 70 arranged therewith, and thus the solenoid is de-energized with the plunger 57 and the rod 58 connected thereto permitted to move to the left, as shown in Fig. 1, due to the action of the spring 61. By such action it will be seen that the part 40 moves out of engagement with the part 42 and again into engagement with the part 41 again changing the gearing through the action of the gears 45 and 46 whereby the feed roller 44 is rotated at a greater rate of speed so as to obtain stitches of a longer length when the tape is sewn between the fastener elements, as shown in Fig. 13. It will be understood that one side of the tape is sewn as the tape passes through the machine, that is, a single line of stitching is provided between the elements and therearound. The tape then is turned around and fed through the machine a second time so as to sew the opposite side and provide the second line of stitching as shown in Fig. 13.

Attention is now directed to Figs. 16 through 24 of the drawings, wherein there is shown the mechanism for guiding the socket tape T' into and through the machine. Such mechanism consists of a guide plate 100 having a substantially straight edge 101. This guide plate is positioned to one side of the needle N with the straight edge thereof substantially in alignment therewith, and is preferably attached to a bar 102 which in turn is suitably attached to the base 20 of the machine.

In the edge of the guide plate 100, there is arranged directly opposite the needle a semi-circular recess 103 which is substantially concentric with the needle. There is arranged on the under side of the presser foot P and forwardly of the needle opening therethrough, as more clearly shown in Figs. 17, 19, and 20, preferably a semi-circular guide portion 104. This guide portion 104, together with the inner wall of the recess 103, provides a semi-circular guide channel 105 around the needle.

Forwardly of the needle and opposite the plate 100, there is provided another guide plate 106 attached to the base 20 and spaced from the plate 100 so as to provide a straight guide channel 107 therebetween having a width slightly greater than the diameter of the disk portion of the temporary holding stud elements 13 carried by the socket tape T'. Between the inner edge of the plate 106 and the needle N and positioned at a point directly opposite the intersection of the guide channel 107 with the semi-circular guide channel 105, there is arranged a movable guide member 108 having an angular edge portion 109 which is arranged diagonally across the guide channel 107 at said intersection. The member 108 is mounted on the outer end of an angularly arranged rod 110 which is slidably mounted in a pair of brackets 112 mounted on the base 20. There is disposed around the rod 110, a compression coil spring 113 having one end thereof abutting an adjustable bushing 114 carried by the rod and the other end abutting the outermost bracket 112. There is arranged on the outer end of the rod 110, an adjustable stop member 115. It is the purpose of the spring 113 to maintain the guide member 108 in its innermost or protracted position, as shown in Fig. 16.

Below the guide plates 100 and 106, there is arranged another movable guide member 114' having a rectangular-shaped guide groove 115' therein. This member 114' is pivoted to the base forwardly thereof by means of a pin portion 116 so that it is permitted to oscillate. This member 114' is moved by the tape as the sockets carried thereby move around the guide channel 105. In this groove 115 of the member 114, the tape is adapted to be guided due to the bulging portion of the material caused by the dome portion 5 of the socket members, as shown in Fig. 21 of the drawings. There is arranged in the edge of the plate 100 forwardly of the needle N and directly opposite the guide plate 106 and at a spaced distance from the recess 103 therein substantially equal to the spacing of the socket elements on the tape, another semi-circular recess 116 so as to permit the tape to move laterally for a purpose and in a manner to be described.

The socket tape T' is fed into and through the machine in the following manner. As stated hereinbefore, there is arranged with each of the socket elements 4, a temporary holding stud element 13 for the purpose of holding temporarily the socket elements in position on the tape. As before, the tape is pulled through the machine by the feed rolls 44 and 49. As the tape passes into the machine, the disk portion of the stud elements 13 passes successively into and through the guide channel 107 between the edges of the plates 100 and 106, the edges of these plates guiding the tape in a straight line movement. As the disk portion of the stud elements 13 approaches the needle N, they contact the angular edge portion 109 of the guide plate 108 thereby forcing the plate 108 outwardly or to a retracted position, as shown in Figs. 16 and 20, against the action of the spring 113 by a camming action of the stud element between the straight edge 101 of the plate 100 and the angular edge portion 109. As the tape moves further along its travel and approaches the end of the presser foot P, it is forced into the semi-circular channel 105 between the inner edge of the recess 103 and the downwardly projecting portion 104 of the presser foot thereby moving the tape laterally. The stud elements move around this channel 105 and out the opposite side thereof where again the tape assumes a straight line movement. After a stud element 13 passes the plate 108, this plate assumes its normal position, as shown in Fig. 16, due to the action of the spring 113 in readiness to act upon the next succeeding fastener element. It will be seen that when a socket member is disposed in the semi-circular channel 105 and the tape is moved laterally that the next succeeding fastener element on the tape is disposed in the recess 116 in the edge of the plate 100. It will be understood that when the tape is being moved in a straight line movement that the tape is being stitched, as at S' between the fastener elements, and that when an element is disposed in the semi-circular channel 105 that the tape is being stitched around the particular fastener element therein.

As the tape passes into the machine, the foot 68 rides on the top thereof and when it strikes a stud member 13, as shown in Fig. 18, it moves the bar 65 around its pivot 66 so as to actuate the micro-switch 64 to close a circuit thereby energizing the solenoid 56. The energization of this solenoid 56 actuates the clutch C in the same manner as previously described so as to change the gearing and the rate of speed of the roller 44 whereby relatively long stitches are provided between the fastener elements and relatively short stitches therearound, as shown in Fig. 23. As before, a single row of stitches is provided on the tape in passing through the machine, and the other row of stitching is provided as before by turning the tape around and passing it again through the machine so as to provide a double row of stitching, as shown in Figs. 23 and 24.

By the use of our invention, it will be seen that a tape is produced in which each fastener element is held in position by snugly embracing annular stitching and that the plies of fabric are continuously stitched to each other. It will be seen that each line of stitching extends between the fastener elements and crosses over the other line of stitching to one side of the fastener elements and therearound. It will also be seen that the tape passes through the machine at two different rates of speed due to the action of the clutch C and its associated mechanism so as to provide a tape wherein the stitches between the fastener elements are relatively long, and the stitches around the fastener elements are relatively short so as to embrace snugly and firmly anchor the fastener elements between the plies of the tape thereby maintaining them in registration with the apertures therein, and preventing displacement of the fastener elements between the plies of the tape.

While we have shown and described two embodiments which our invention may assume in practice, it will be understood that these embodiments are merely for the purpose of illustration and description, and that other forms may be devised within the scope of our invention as defined in the appended claims.

What we claim as our invention is:

1. In a sewing machine for sewing snap fastener elements to a tape, sewing mechanism including a reciprocable needle, means for feeding the tape having fastener elements carried thereby relative to said needle, and means adjacent said needle which contacts the fastener elements and guides them as they are carried by said tape into and through said machine alternately in substantially a straight line and around said needle as the tape is fed continuously into and through said machine so as to effect a substantially straight line of stitching between said elements and an offset line of stitching therearound.

2. In a sewing machine for sewing snap fastener elements to a tape, sewing mechanism including a reciprocable needle, means for feeding the tape having fastener elements carried thereby relative to said needle, and means adjacent said needle which contacts the fastener elements and guides them as they are carried by said tape into and through said machine alternately in substantially a straight line and around said needle as the tape is fed continuously into and through said machine so as to effect a substantially straight line of stitching between said elements and an offset line of stitching therearound, and means included with said tape feeding means for advancing the tape at different rates of speed so that the tape is advanced at a greater rate when the needle is sewing the tape between the fastener elements than when it is sewing around the fastener elements so as to provide longer stitches between the fastener elements than therearound.

3. In a sewing machine for sewing snap fastener elements to a tape, sewing mechanism including a reciprocable needle, means for feeding the tape having fastener elements carried thereby relative to said needle, and means adjacent said needle which contacts the fastener elements and guides them as they are carried by said tape into and through said machine alternately in substantially a straight line and around said needle as the tape is fed continuously into and through said machine so as to effect a substantially straight line of stitching between said elements and an offset line of stitching therearound, and means included with said tape feeding means for advancing the tape at different rates of speed so that the tape is advanced at a greater rate when the needle is sewing the tape between the fastener elements than when it is sewing around the fastener elements so as to provide longer stitches between the fastener elements than therearound, said last mentioned means including a member adapted to engage the fastener elements as they successively pass therealong through the machine for actuating said last mentioned means.

4. In a sewing machine for sewing snap fastener elements to a tape, sewing mechanism including a reciprocable needle, means for feeding the tape relative to said needle, means for guiding the fastener elements and tape as the same are fed continuously into and through said machine including a guide plate positioned to one side of said needle, said guide plate having a straight edge substantially in alignment with said needle against which the fastener elements are disposed as the tape is fed into the machine, said plate having a recess arranged in said straight edge directly opposite said needle so as to permit the tape and fastener elements to move laterally relative thereto when a fastener element is in the vicinity of said needle, and means for maintaining said fastener elements against said straight edge and for forcing the same into the recess in the edge of said plate as they pass therealong so as to sew the tape substantially centrally thereof between the fastener elements and around one side of the fastener elements when they are disposed in said recess.

5. In a sewing machine for sewing snap fastener elements to a tape, sewing mechanism including a reciprocable needle, means for feeding the tape relative to said needle, means for guiding the fastener elements and tape as the same are fed continuously into and through said machine including a guide plate positioned to one side of said needle, said guide plate having a straight edge substantially in alignment with said needle against which the fastener elements are disposed as the tape is fed into the machine, said plate having a recess arranged in said straight edge directly opposite said needle so as to permit the tape and fastener elements to move laterally relative thereto when a fastener element is in the vicinity of said needle, means for maintaining said fastener elements against said straight edge and for forcing the same into the recess in the edge of said plate as they pass therealong so as to sew the tape substantially centrally thereof between the fastener elements and around one side of said fastener elements when they are disposed in said recess, and means included with said tape feeding means for advancing the tape at different rates of speed so that the tape is advanced at a greater rate when the needle is sewing the tape between the fastener elements than when it is sewing around the fastener elements so as to provide longer stitches between the fastener elements than therearound.

6. In a sewing machine for sewing snap fastener elements to a tape, sewing mechanism including a reciprocable needle, means for feeding the tape relative to said needle, means for guiding the fastener elements and tape as the same are fed continuously into and through said machine including a guide plate positioned to one side of said needle, said guide plate having a straight edge substantially in alignment with said needle against which the fastener elements are disposed as the tape is fed into the machine, said plate having a recess arranged in said straight edge directly opposite said needle so as to permit the tape and fastener elements to move laterally relative thereto when a fastener element is in the vicinity of said needle, means for maintaining said fastener elements against said straight edge and for forcing the same into the recess in the edge of said plate as they pass therealong so as to sew the tape substantially centrally thereof between the fastener elements and around one side of said fastener elements when they are disposed in said recess, and means included with said tape feeding means for advancing the tape at different rates of speed so that the tape is advanced at a greater rate when the needle is sewing the tape between the fastener elements than when it is sewing around the fastener elements so as to provide longer stitches between the fastener elements than therearound, said last mentioned means including a member adapted to engage the fastener elements as they successively pass therealong through the machine for actuating said last mentioned means.

7. In a sewing machine for sewing snap fastener elements to a tape, sewing mechanism including a reciprocable needle, means for feeding the tape relative to said needle, means for guiding the tape and fastener elements carried thereby into and through said machine, means arranged in the vicinity of said needle for guiding the fastener elements therearound as the tape is fed continuously into and through the machine so that the stitches are positioned around one side of said fastener elements, and means included with said tape feeding means for advancing the tape at different rates of speed so that the tape is advanced at a greater rate when the needle is sewing the tape between the fastener elements than when it is sewing around the fastener elements so as to provide longer stitches between the fastener elements than therearound.

8. In a sewing machine for sewing snap fastener elements to a tape, sewing mechanism including a reciprocable needle, means for feeding the tape relative to said needle, means for guiding the fastener elements and tape as the same are fed continuously into and through said machine including a guide plate positioned to one side of said needle, said guide plate having a straight edge substantially in alignment with said needle against which the fastener elements are disposed as the tape is fed into the machine, said plate having a pair of recesses arranged in said straight edge with one positioned directly opposite said needle and the other positioned a spaced distance therefrom substantially equal to the spaced-apart distance of the fastener elements on said tape so as to permit the tape and fastener elements to move laterally relative to said needle when a fastener element is in the vicinity thereof, and means for maintaining said fastener elements against said straight edge and for forcing the same into said recesses in the edge of said plate as they pass therealong so as to sew the tape substantially centrally thereof between the fastener elements and around one side of said fastener elements when they are disposed in said recesses.

9. In a sewing machine for sewing snap fastener elements to a tape, sewing mechanism including a reciprocable needle, means for feeding the tape relative to said needle, means for guiding the fastener elements and tape as the same are fed continuously into and through said machine including a guide plate positioned to one side of said needle, said guide plate having a straight edge substantially in alignment with said needle against which the fastener elements are disposed as the tape is fed into the machine, said plate having a pair of recesses arranged in said straight edge with one positioned directly opposite said needle and the other positioned a spaced distance therefrom substantially equal to the spaced-apart distance of the fastener elements on said tape so as to permit the tape and fastener elements to move laterally relative to said needle when a fastener element is in the vicinity thereof, means for maintaining said fastener elements against said straight edge and for forcing the same into said recesses in the edge of said plate as they pass therealong so as to sew the tape substantially centrally thereof between the fastener elements and around one side of said fastener elements when they are disposed in said recesses, and means included with said tape feeding means for advancing the tape at different rates of speed so that the tape is advanced at a greater rate when the needle is sewing the tape between the fastener elements than when it is sewing around the fastener elements so as to provide longer stitches between the fastener elements than therearound.

10. In a sewing machine for sewing snap fastener elements to a tape, sewing mechanism including a reciprocable needle, means for feeding the tape relative to said needle, means for guiding the tape and fastener elements carried thereby into and through the machine including a pair of guide plates having substantially straight edge portions which are spaced apart so as to provide a guide channel therebetween arranged substantially in alignment with said needle and through which the fastener elements pass, one of said plates positioned to one side of said needle and having a recess arranged in the edge thereof directly opposite said needle so as to permit the tape and fastener elements to move laterally relative thereto when a fastener element is in the vicinity of said needle, and means for forcing the fastener elements into said recess as they pass successively therealong so as to sew the tape substantially centrally thereof between the fastener elements and around one side of the fastener elements when they are disposed in said recess.

11. In a sewing machine for sewing snap fastener elements to a tape, sewing mechanism including a reciprocable needle, means for feeding the tape relative to said needle, means for guiding the tape and fastener elements carried thereby into and through the machine including a pair of guide plates having substantially straight edge portions which are spaced apart so as to provide a guide channel therebetween arranged substantially in alignment with said needle and through which the fastener elements pass, one of said plates positioned to one side of said needle and having a recess arranged in the edge thereof directly opposite said needle so as to permit the tape and fastener elements to move laterally relative thereto when a fastener element is in the vicinity of said needle, means for forcing the fastener elements into said recess as they pass successively therealong so as to sew the tape substantially centrally thereof between the fastener elements and around one side of the fastener elements when they are disposed in said recess, and means included with said tape feeding means for advancing the tape at different rates of speed so that the tape is advanced at a greater rate when the needle is sewing the tape between the fastener elements than when it is sewing around the fastener elements so as to provide longer stitches between the fastener elements than therearound.

12. In a sewing machine for sewing snap fastener elements to a tape, the combination as defined in claim 10, wherein the means for forcing the fastener elements into the recess in the plate consists of a member arranged around the needle having a contour conforming substantially to that of said recess so as to provide a guide channel between the walls of said recess and said member whereby the fastener elements pass around through said channel and around said needle.

13. In a sewing machine for sewing snap fastener elements to a tape, sewing mechanism including a reciprocable needle, means for feeding the tape relative to said needle, means for guiding the tape and fastener elements carried thereby into and through the machine including a pair of guide plates having substantially straight edge portions which are spaced apart so as to provide a guide channel therebetween arranged substantially in alignment with said needle and through which channel the fastener elements pass, one of said plates positioned to one side of said needle and having a pair of recesses arranged in the edge thereof with one positioned directly opposite said needle and the other positioned a distance therefrom substantially equal to the spaced-apart distance of the fastener elements on said tape so as to permit the tape and fastener elements to move laterally relative to said needle when a fastener element is in the vicinity thereof, and means for forcing the fastener elements into said recesses as they pass successively therealong so as to sew the tape substantially centrally thereof between the fatener elements and around one side of the fastener elements when they are disposed in said recesses.

14. In a sewing machine for sewing snap fastener elements to a tape, sewing mechanism including a reciprocable needle, means for feeding the tape relative to said needle, means for guiding the tape and fastener elements carried thereby into and through the machine including a pair of guide plates having substantially straight edge portions which are spaced apart so as to provide a guide channel therebetween arranged substantially in alignment with said needle and through which channel the fastener elements pass, one of said plates positioned to one side of said needle and having a pair of recesses arranged in the edge thereof with one positioned directly opposite said needle and the other positioned a distance therefrom substantially equal to the spaced-apart distance of the fastener elements on said tape so as to permit the tape and fastener elements to move laterally relative to said needle when a fastener element is in the vicinity thereof, means for forcing the fastener elements into said recesses as they pass successively therealong so as to sew the tape substantially centrally thereof between the fastener elements and around one side of the fastener elements when they are disposed in said recesses, and means included with said tape feeding means for advancing the tape at different rates of speed so that the tape is advanced at a greater rate when the needle is sewing the tape between the fastener elements than when it is sewing around the fastener elements so as to provide longer stitches between the fastener elements than therearound.

15. In a sewing machine for sewing snap fastener elements to a tape, the combination as defined in claim 13, wherein the means for forcing the fastener elements in the recesses of the guide plate as they pass successively therealong consists of a pair of spaced-apart projections arranged along the edge of the other plate having a contour conforming to that of the recesses in said first mentioned plate so as to provide a guide channel between the walls of the recesses and said projections whereby the fastener elements follow said guide channel and around said needle.

RALPH A. PROUD.
HOWARD C. STANLEY.

REFERENCES CITED

The following references are of record in the file of this patent:

UNITED STATES PATENTS

| Number | Name | Date |
|---|---|---|
| 1,245,297 | Wilson | Nov. 6, 1917 |
| 1,682,362 | Von Halle | Aug. 28, 1928 |
| 2,052,896 | Roseman | Sept. 1, 1936 |
| 2,124,033 | Hand | July 19, 1938 |